United States Patent [19]

Boatella I Riera et al.

[11] Patent Number: 5,534,279

[45] Date of Patent: Jul. 9, 1996

[54] PROCESS FOR PRODUCING A LOW SODIUM MEAT PRODUCT

[75] Inventors: Josep Boatella I Riera; Magdalena Rafecas I Martinez; Rafael Codony I Salcedo, all of Barcelona; Genaro Minguell I Juncosa; Josep Cases I Sellart, both of Bellpuig, all of Spain

[73] Assignee: Gemi Aliment, S.A., Bellpuig, Spain

[21] Appl. No.: 190,513

[22] Filed: Feb. 2, 1994

[30] Foreign Application Priority Data

Feb. 3, 1993 [ES] Spain ..................... 93.00.194

[51] Int. Cl.$^6$ ..................... A23L 1/314; A23L 1/317
[52] U.S. Cl. .................. 426/266; 426/281; 426/407; 426/412; 426/641; 426/646
[58] Field of Search .................. 426/264, 265, 426/266, 281, 641, 646, 407, 412, 652, 519

[56] References Cited

U.S. PATENT DOCUMENTS

| | | | |
|---|---|---|---|
| 2,596,067 | 5/1952 | Brissey | 426/281 X |
| 2,629,311 | 2/1953 | Graves | 426/281 X |
| 2,910,369 | 10/1959 | Klein | 426/652 X |
| 3,006,767 | 10/1961 | Huckabee | 426/281 X |
| 3,347,679 | 10/1967 | Nordin | 426/281 |
| 3,679,434 | 7/1972 | Bard et al. | 426/281 X |
| 3,775,134 | 11/1973 | Michels et al. | 426/281 |
| 4,038,426 | 7/1977 | Jespersen et al. | 426/281 X |
| 4,313,963 | 2/1982 | Greenspan | 426/281 X |
| 4,547,379 | 10/1985 | Moller et al. | 426/281 |

FOREIGN PATENT DOCUMENTS 0508172 10/1992 European Pat. Off. ............. 426/281

*Primary Examiner*—Arthur L. Corbin
*Attorney, Agent, or Firm*—Jacobson, Price, Holman & Stern

[57] ABSTRACT

The process of meat curing involves a number of steps. Such steps include the injection of a brine composition into a meat product. The brine composition of the present invention comprises calcium citrate, calcium lactate, potassium chloride, lactose, saccharose, potassium phosphate, ascorbic acid, and sodium nitrite. The injected brine composition produces a meat product which is low in sodium, is notably richer in potassium and calcium and in which the meat produced maintains the characteristic flavor and aroma of meat products high in sodium content.

10 Claims, No Drawings

PROCESS FOR PRODUCING A LOW SODIUM MEAT PRODUCT

The present invention is directed to a process for producing a low sodium meat product such as cooked ham with zero weight-loss and which obtains a flavor identical to ham cooked with a high sodium content. Specifically the process involves the use of a substantially sodium-free brine composition, which is injected into the meat product, during the curing process.

BACKGROUND OF THE INVENTION

The sodium content of a standard extra grade ham varies between 0.8 and 1%. The use of the brine composition according to the present invention results in a meat product having levels of between 0.4 to 0.45%.

In general, the intake of salt in a traditional diet is six to ten times more than the human body requires. This results in increased liquid retention in the human body, favoring increased blood volume and pressure. The process of the present invention is a full response to the consumer who is concerned with eating healthily, in particular, eating more natural foods. The substantially salt-free meat product of the present invention has considerable benefits over meat products, such as ham, cooked in other brine compositions, providing a diet which is more balanced in electrolytes required for the correct functioning of the human body. Furthermore, the meat product produced offers an aroma, flavor and consistency which is appropriate to the product. Salt is, in the opinion of many researchers, considered a basic ingredient for the extraction of muscular protein (actin and myosin) in meat maceration processes, giving a consistency and cut which are beneficial to the product. The ingredients used in the brine composition of the present invention provide the same effect as salt and moreover, are considered under the new E.E.C. Directive as like ingredients at the doses used.

Existing techniques in the manufacture of meats, such as cooked ham, use levels of added sodium in their preparation of between 0.8 and 1%. As stated above, this level of salt content is between six to ten times more than the human body requires and is considered harmful. No methods or techniques are known for the manufacture of meats, such as cooked ham, which are entirely free of added sodium. The process used in the present invention not only lacks the addition of sodium, but also produces a meat product notably richer in potassium and calcium, and involves injecting a brine composition which is completely new.

SUMMARY OF THE INVENTION

In a process for the manufacture of a meat product such as cooked ham, according to the present invention, a pleasant flavor is obtained and the consumer does not note the absence of salt from the product. To this end, natural meat flavorings can also be used, with aromatic herbs, giving the product a characteristic flavor and aroma which might be defined as smooth, lasting on the palate, and similar to that of spiced meat.

The careful burnishing and de-greasing of the ham means that fat does not exceed 3%, while protein values vary between 18 and 18.5%. The meat product produced is a suitable food for low calorie diets, providing between 95–110 Kcal/100 g.

DESCRIPTION OF THE PREFERRED EMBODIMENTS

The process used in the present invention, for the production of a low sodium meat product, such as ham, involves the following steps:

a) quality control of a fresh meat product such as ham;
b) removal of nerves, bones and fat from the meat;
c) injection of a brine composition into the meat;
d) maceration of the meat using a combined Hamburg-Bombo technique, for 24 hours and at 2°–5° C. in a vacuum;
e) vacuum-packing the macerated meat;
f) cooking until the centre of the meat is 67° C.;
g) unmoulding, labeling, weighing and final packing of the meat product, including labeling with the best-by date; and
h) storing in a refrigerator or the like until sold.

The brine composition used for injection into the meat is as follows, for 100 liters of water:

calcium citrate, 1,375 kg,
calcium lactate, 0.750 kg,
potassium chloride, 8 kg,
lactose, 3 kg,
saccharose, 3 kg,
potassium phosphate, 5,500 kg,
ascorbic acid, 0.185 kg, and
sodium nitrite, 0.280 kg.

This yields 122 kg of brine.

The brine is injected at 20% into the lean meat. Flavorings may be added at the first massage, along with carragenate (2 g/kg). Examples of such flavorings include:

meat flavoring, in the amount of 0.6 g/kg,
lasting flavor, in the amount of 1 g/kg,
spiced flavoring, in the amount of 0.4 g/kg.

Sodium is not added throughout the manufacturing process and the brine composition used is substantially salt free. It is also notably enriched in potassium and calcium.

The quality of the product has been examined and reported on favorably by the Pharmacy School in the University of Barcelona's Department of Nutrition and Diet, with the endorsement of Drs. Josep Boatella Riera, Rafael Codony Salcedo and Magdalena Rafecas Martinez.

In the consideration of the present invention as described herein, it is noted that the different parts, mixtures and components may be slightly varied provided that this does not alter the essential points which are the subject of the present invention.

What is claimed is:

1. In a process for curing a meat product comprising (a) removing bones, nerve and fat from a meat product;
(b) injecting a brine composition into said meat product;
(c) macerating said meat product for approximately 24 hours in a vacuum at a temperature of between 2°–5° C.;
(d) vacuum packaging said macerated meat product;
(e) heating the vacuum packaged meat product until an internal region of said meat product reaches a temperature of approximately 67° C.;
(f) unmoulding and re-packaging said meat product for sale; and
(g) cool-storing said meat product;

wherein the improvement comprises injecting, as the brine composition of step (b), a brine composition comprising calcium citrate, calcium lactate, potassium chloride, lactose, saccharose, potassium phosphate, ascorbic acid, and sodium nitrite into said meat product.

2. In the process of claim 1 wherein, per 100 liters of water, the amount of calcium citrate is 1,375 kg, the amount of calcium lactate is 0.750 kg, the amount of potassium chloride is 8 kg, the amount of lactose is 3 kg, the amount of saccharose is 3 kg, the amount of potassium phosphate is 5.500 kg, the amount of ascorbic acid is 0.185 kg, and the amount of sodium nitrite is 0.280 kg.

3. In the process of claim 1 further comprising adding at least one flavoring to the meat product.

4. In the process of claim 3 wherein said at least one flavoring is selected from the group consisting essentially of meat flavoring, long-lasting flavoring and spiced flavoring.

5. In the process of claim 4 wherein the amount of said meat flavoring is 0.6 g/kg of brine composition.

6. In the process of claim 4 wherein the amount of said long-lasting flavoring is 1 g/kg of brine composition.

7. In the process of claim 4 wherein the amount of said spiced flavoring is 0.4 g/kg of brine composition.

8. In the process of claim 1 wherein said composition further comprises carrageeanate.

9. In the process of claim 8 wherein the amount of said carrageeanate is 2 g per kg of brine.

10. In the process of claim 1 wherein said meat product is ham.

\* \* \* \* \*